Aug. 18, 1942.　　　L. V. TOWT ET AL　　　2,293,577
CONCUSSION CHAMBER FOR CHURNING
Filed March 27, 1940
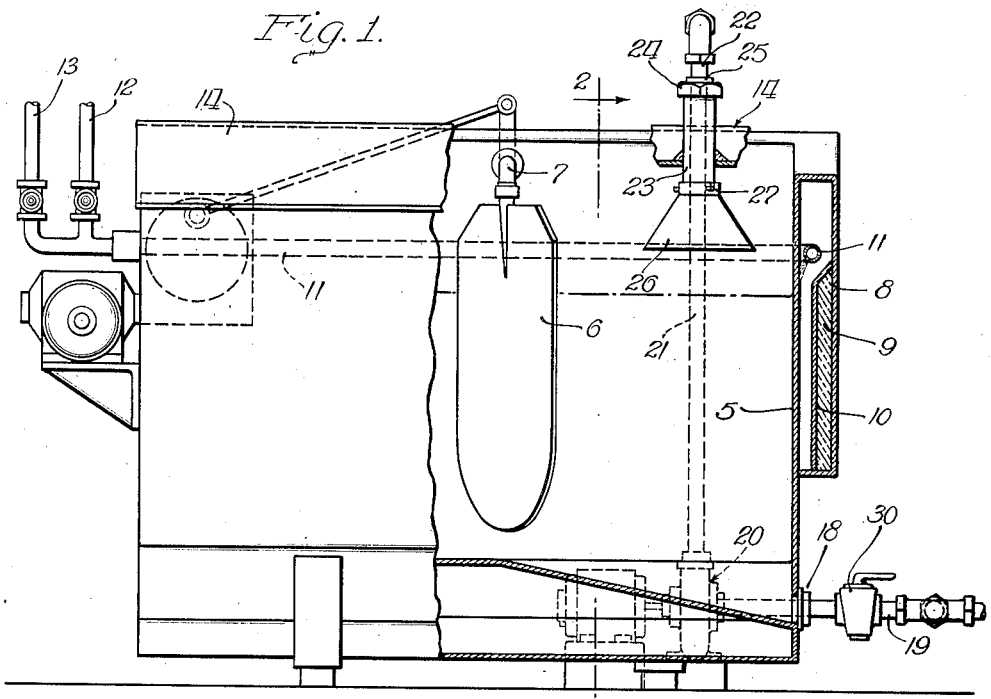
Fig. 1.
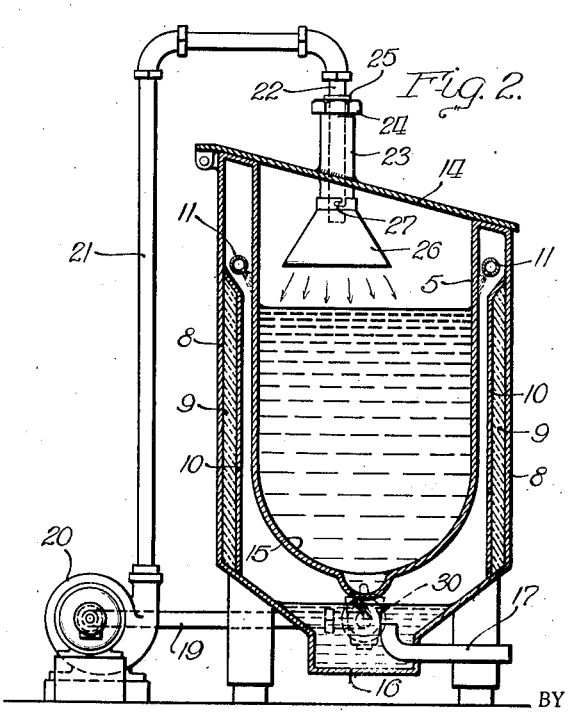
Fig. 2.
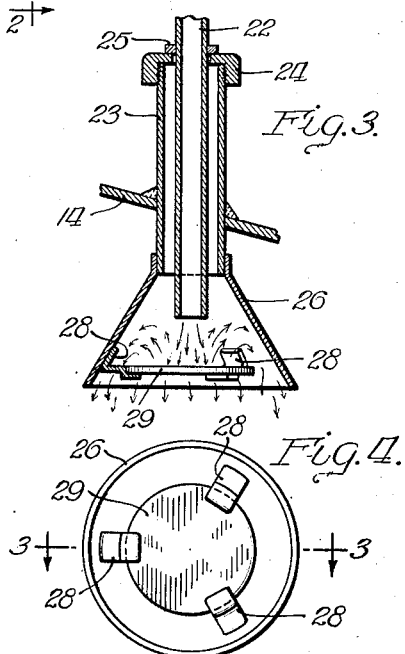
Fig. 3.
Fig. 4.
INVENTORS.
Louis V. Towt
Latour O. Ott
BY Norman E. H. Weletzke
ATTORNEY.

Patented Aug. 18, 1942

2,293,577

UNITED STATES PATENT OFFICE 2,293,577

CONCUSSION CHAMBER FOR CHURNING

Louis V. Towt, Oakland, and Latour O. Ott, Los Angeles, Calif., assignors to Cherry-Burrell Corporation, Chicago, Ill., a corporation of Delaware Application March 27, 1940, Serial No. 326,163

3 Claims. (Cl. 31—34)

This invention relates to improvements and apparatus for causing the agglomeration of butter fat globules in a dairy product to form butter flakes therein. More particularly the invention relates to a concussion chamber for use in the forming of butter flakes in buttermilk.

The prime object of the invention is to provide a concussion chamber into which the liquid dairy product may be forcefully pumped and impacted or impinged against an impact or concussion surface to produce the desired butter flakes within a product containing butter fat globules in a finely dispersed phase.

A further object is to provide a concussion chamber, as referred to above, which is of sanitary construction and which provides for the return of the liquid through free air at reduced speed and with reduced energy to the surface of the remaining liquid in the vat.

An important feature of the present invention is the provision of a simple and novel apparatus employing the principle of violent mechanical impact to aid in the forming of butter flakes in buttermilk by the use of the apparatus in the process of churning a dairy product containing butter fat globules. By the use of this apparatus the undesired over-agitation and undesired excessive over-mechanical handling of the buttermilk are avoided.

Other important features of the invention will be apparent upon examination of the details of construction and arrangement of parts, all of which will be first fully described and then specifically pointed out in the appended claims, reference being made to the accompanying drawing, in which:

Figure 1 is a longitudinal elevational view of the apparatus partially in broken-away section.

Figure 2 is a transverse sectional view of the apparatus shown in Figure 1 taken along line 2—2 of Figure 1.

Figure 3 is an enlarged vertical sectional view of the concussion chamber taken along line 3—3 of Figure 4.

Figure 4 is an enlarged bottom view of the concussion chamber.

Referring to the figures, in which like parts are identified by the same reference characters, 5 represents an inner tank or vat in which a broad agitator paddle 6 is suspended for oscillation upon shaft 7. The shaft 7 is connected by any suitable crank and linkage assemblage to a motor operated speed reducer having a driving crank of suitable nature whereby the desired oscillation of the agitator paddle 6 may be effected.

The external jacket 8 completely surrounds the inner tank 5 in spaced relation thereto and is insulated against heat transfer by a layer of insulation material 9 which is held in place by an intermediate lining 10 in spaced relation to the tank 5. The layer of insulation 9 and the intermediate lining 10 terminate short of the top of the tank 5 and above them is disposed a spray pipe 11 extending completely about the wall of the tank 5. The spray pipe 11 is provided with spray apertures for directing jets of hot water, steam, cold water or other heat exchange medium against the exterior surface of tank 5. The hot water, cold water, steam or other heating or cooling medium is supplied to the spray pipe 11 through the valve controlled supply pipes 12 and 13 communicating with the spray pipe 11.

The upper margins of the tank 5 are carried over or joined with the upper margins of the external jacket 8 thereby enclosing the space in which the spray pipe 11 operates. A hinged cover 14 is provided at the top of the tank 5 to give access to the interior thereof. The tank 5 preferably has a cylindrical bottom at 15 beneath which the jacket 8 is provided with a sump 16 from which the water or other fluid or condensed steam flowing down the exterior surface of the tank 5 may be withdrawn through a discharge pipe 17.

The tank 5 is provided at one of its ends with an outlet 18 communicating through pipe 19 with the intake connection of a centrifugal or other pump 20. The pump discharges into conduit 21 which passes upwardly to a position above the tank cover 14, where it is connected to the upper end of a nozzle 22. As shown in the figures, nozzle 22 is at the same end of the tank 5 as the discharge or outlet connection 18. It is, however, not essential that such particular arrangement be followed and the nozzle 22 may be positioned at the opposite end of the tank or at any intermediate position desired.

Nozzle 22 extends into a jacket 23 preferably of cylindrical configuration. Jacket 23 extends through an aperture in the tank cover 14 and is fixed thereto by any suitable means, such, for example, as by welding. The jacket 23 is provided at its upper end with an apertured closure cap 24 through which the nozzle 22 extends. The apertured closure cap 24 supportingly engages an outer peripheral flange 25 fixed to nozzle 22 near the upper extremity of the nozzle 22, thereby supporting the same.

The lower extremity of the jacket 23, which extends through the aperture in the cover 14, is provided with a readily detachable outwardly flaring or conical extension jacket 26. The conical extension jacket 26 is detachably supported on the main jacket 23 by any suitable means, such, for example, as a bayonet joint generally indicated by the numeral 27.

In the inner face of the lower portion of the conical extension jacket 26 are provided three centering and supporting lugs 28 which centeringly support a circular concussion or impact plate 29 immediately below the lower end of the nozzle 22 and in spaced relation to the wall of the conical extension jacket 26. The combination of the cylindrical main jacket element 23, the frusto-conical extension jacket element 26 and the circular concussion plate 29 comprises the concussion chamber. The circular concussion plate 29, the supporting lugs 28 and the frusto-conical extension jacket 26 are all of such dimensions and proportions that the concussion plate may be readily removed from the extension jacket 26 by tilting one edge thereof upwardly, moving the opposite edge inwardly away from the adjacent surface of the concussion chamber 26 and then withdrawing the plate 29 downwardly and outwardly from the jacket 26.

In the operation of the apparatus comprising the instant invention, after the liquid dairy product in the vat 5 has been pasteurized and cultured as later to be described, a quantity of the liquid is withdrawn from the vat 5 through the discharge aperture 18 and discharge control valve 30. The liquid passes through the pipe 19 into the pump 20, which forces the withdrawn liquid through the pipe 21 into nozzle 22 which directs the rapidly flowing liquid forcefully into the concussion chamber and against the concussion plate 29. From the concussion chamber the liquid drains through the space between the edge of the plate 29 and the adjacent wall of the jacket 26, falling through free air into the vat 5 and onto the upper surface of the remaining liquid in the vat.

The liquid dairy product, which is preferably a cultured, pasteurized and standardized milk containing fat globules and which has been so impacted or impinged against a concussion plate as just described, will have formed therein butter flakes produced by the agglomeration of fat globules which result from the mechanical impacting of the product against the concussion plate 29. The method involved in the use of the above described apparatus for the processing of a liquid dairy product to form butter flakes therein is as follows:

Skim milk is standardized with separated and preferably pasteurized cream to add to the skim milk ½% to 1% butter fat. The total solids are reduced to approximately 8.2% by adding water. The batch of skim milk is heated to approximately 190° F. and held there for approximately 45 minutes to pasteurize the same. This heating and holding or pasteurizing process is brought about by delivering steam or hot water into the spray pipe 11 from one or the other of the valve supply pipes 12 and 13. The heating will, in a machine of conventional size, require about 50 minutes and the temperature should be held approximately at the degree stated for approximately the time indicated.

Having thus pasteurized the product, cold or refrigerated water is introduced into the spray pipe 11 through one or the other of the spray pipes 12 and 13 to chill the batch in the vat 5 to as low a temperature as the temperature of the water will permit, at least 68° F. to 70° F. depending on the season of the year. Such a cooling procedure will require approximately 20 or 30 minutes' time in a machine of conventional size.

There is now added to the batch in the vat 1% to 2% of .87% acid starter which is thoroughly mixed therewith for approximately 10 minutes. The swinging paddle 6 in the vat 5 may be used for this purpose. The product in the vat is then allowed to stand for approximately 14 hours or until a desired acidity is reached and a firm curd formed. The desired acidity will normally lie within a range of .77 to .85% acidity. During the last 3 hours of the formation of the curd the product should be watched closely to prevent overriping thereof.

At this time it is desired to add butter color to give higher color to the butter granules. The proper amount of butter fat, as previously referred to, necessary to standardize the product is also added at this time. The paddle 6 is then set in operation at one-half stroke to break up the curd within the vat and enough refrigerated water is circulated through the spray pipe 11 to cool the batch within the vat to approximately 68° F. preparatory to the churning operation.

The pump 20 is now set in operation and the outlet valve 30 is opened, permitting the product within the vat 5 to drain through conduit 19 into the pump 20. The pump 20 will forcefully circulate the product within the vat 5 from the vat 5 through pipe 19 into the nozzle 22, which will direct the product into the concussion chamber and against the concussion plate 29 from where the product will drain through free air back onto the surface of the liquid or batch within the vat 5.

A certain amount of the formation of butter flakes or the agglomeration of butter globules will be caused by the action of the pump 20. However, the forceful impinging of the liquid dairy product containing butter fat globules in the dispersed phase against the concussion plate 29 will cause the rapid agglomeration of butter fat globules thereby forming butter flakes in the product. The circulation of the product from the vat, through the pump, into the concussion chamber and back into the vat should continue for approximately 10 to 20 minutes to complete the churning process, depending upon the amount of butter fat used and other conditions of the liquid dairy product within the vat.

The slow, easy discharge of the product from the concussion chamber through free air back onto the surface of the product in the vat will aid in the prevention of the incorporation of undesirable quantities of air within the liquid dairy product. The violent impinging of the product from the nozzle 22 against the concussion plate 29 brings about a violent mechanical agitation within the liquid, causing the agglomeration of butter fat globules to form butter flakes.

The concurrent and cooperative action of the agitator paddle 6 within the vat 5 and the concussive impacting of the liquid dairy product into the concussion chamber and against the concussion plate 29 produce the desired quantity and size of butter flakes within the product and texture of the cultured and standardized buttermilk within the vat.

When the proper size and quantity of butter flakes are obtained the batch is cooled in the tank 5 by circulating refrigerated water through the spray pipe 11 in a sufficient quantity to reduce the temperature of the product to approximately 45° F. or 50° F. The paddle 6 is maintained in operation at one-half stroke during this additional cooling operation to thereby expel any remaining undesired quantities of air entrained in the liquid in the tank during the churning operation. The cooling operation, as just described, will require approximately half an hour. The product, after cooling, may then be held in the tank until ready for bottling or it may be drawn off into cans and held in a refrigerator, if desired, or bottled.

It will, of course, be understood by those skilled in the art that the temperatures and periods of time, acid and butter fat content all, as stated above, are given merely by way of example and with no intent to limit the invention in any such respect. The initial heating and various cooling processes are merely the conventional steps in the production of a buttermilk according to the method as described. The apparatus, upon which the novelty is predicated herein, is largely concerned with the mechanical treatment of the material by circulating it under the conditions as stated and concussively impacting or impinging the same against a concussion plate as it passes through a concussion chamber.

The buttermilk produced according to the method and with the apparatus as herein described has a finer size of butter granule. The butter granules produced in the buttermilk in the manner as just previously described stay in suspension better than the butter granules produced by previous or prior art methods of churning butter and buttermilk. A product of improved flavor also results from the elimination of air therefrom as well as from the speedy completion of the entire process in a single container and the associated conduits, pumping means and concussion chamber.

In the apparatus just described it has been found desirable to use materials which are substantially non-corrosive, such, for example, as stainless steel. The apparatus as described, including the vat in which the entire processing of the product can be carried out and the concussion chamber to produce the mechanical concussive impact upon the product to form butter flakes therein, all lend themselves especially well to the working of the process previously described.

It will, of course, be obvious to those skilled in the art that various modifications in the details of the construction of the apparatus heretofore described may be made within the scope of the present invention and it is not desired to limit the claims to the particular details of the apparatus described except as set forth in the appended claims.

The invention is hereby claimed as follows:

1. In a device of the class described, a vat containing a quantity of liquid dairy material in which is present a small percentage of butter fat in the dispersed phase, a discharge connection for said vat, a concussion chamber positioned above the material in the vat and so constructed and arranged that liquid material introduced into said chamber drains therefrom through free air into the vat, a conduit connecting the discharge connection and the concussion chamber, and means within said conduit for circulating material from said vat through said conduit and into said concussion chamber, said concussion chamber comprising a frusto-conical jacket having a circular concussion plate directly in the path of the liquid supplied to said concussion chamber, whereby the liquid supplied to said chamber will be violently impacted against said concussion plate to cause agglomeration of fat globules within the liquid thereby forming butter flakes.

2. A concussion chamber of the type described comprising, in combination, a substantially circular concussion plate, a supply nozzle for directing a stream of material against said concussion plate, a frusto-conical jacket housing the discharge end of said nozzle and also housing said concussion plate, and means for supporting said concussion plate upon said jacket, said concussion plate being substantially out of contact with said jacket, whereby to provide a free path for the escape of material from said jacket.

3. In a concussion chamber for concussively processing liquid, a liquid supply nozzle for impinging a stream of liquid forcefully against a concussion plate, a circular concussion plate, a frusto-conical jacket disposed about said plate and said nozzle between said nozzle and said concussion plate, and means supporting said concussion plate upon said jacket, said concussion plate, said nozzle and said jacket all being of such proportions, dimensions and arrangement that said plate may be removed from said jacket by tilting one edge thereof upwardly and moving the other edge thereof inwardly a sufficient distance to permit said plate to be withdrawn downwardly from said jacket.

LOUIS V. TOWT.
LATOUR O. OTT.